Feb. 23, 1971 L. C. PARODE ET AL 3,566,405

FREQUENCY CONTROLLED RANGE GATE

Filed Feb. 24, 1958 2 Sheets-Sheet 1

INVENTORS,
LOWELL C. PARODE,
NEAL F. CURRENT,
CLINTON LEW

BY Walter J. Adam

ATTORNEY

Feb. 23, 1971 L. C. PARODE ET AL 3,566,405

FREQUENCY CONTROLLED RANGE GATE

Filed Feb. 24, 1958 2 Sheets-Sheet 2

INVENTORS,
LOWELL C. PARODE,
NEAL F. CURRENT,
CLINTON LEW

BY Walter J. Adam

ATTORNEY

United States Patent Office 3,566,405
Patented Feb. 23, 1971

3,566,405

FREQUENCY CONTROLLED RANGE GATE

Lowell C. Parode, Manhattan Beach, and Neal F. Current and Clinton Lew, Los Angeles, Calif., assignors to Hughes Aircraft Company, Culver City, Calif., a corporation of Delaware Filed Feb. 24, 1958, Ser. No. 717,263
Int. Cl. G01s *9/14*
U.S. Cl. 343—7.3 8 Claims This invention relates to a variable frequency tracking range gate generator and particularly to a means for varying the average range gate pulse repetition frequency with a D.C. control voltage in a linear manner so as to provide a simplified and highly accurate system.

Radar systems conventionally utilize range gate generators to follow in time coincidence an echo signal reflected from a target. In the range gate generators of the prior art a range gate pulse is formed in response to the frequency of signals received from an oscillator during each interpulse period as defined by succeeding range gate pulses. During a given interpulse period the times of occurrence of the generated range gate pulse and an echo pulse are compared in a time discriminator whose output is a function of the time displacement between the two pulses. The output of the time discriminator is then appropriately processed and used to change the operation of an oscillator which controls the range gate frequency during subsequent interpulse periods as required to reduce coincidence error of the range gate pulse and the echo pulse. The frequency of the oscillator is thus controlled during each interpulse period to generate the range gate pulse in such a manner as to cause coincidence with the echo pulse. The change in frequency of the oscillator is conventionally controlled by use of a saturable reactor in the oscillator's control circuit.

A disadvantage of a saturable reactor to control the oscillator is that the characteristics of the saturable reactor are very sensitive to temperature variations. Thus, without compensating circuitry, the range of frequency shift of the oscillator cannot be maintained sufficiently large throughout the environmental temperature extremes which may be encountered with various environments as missiles, for example. Furthermore, the transfer characteristics of an oscillator utilizing a saturable reactor are extremely nonlinear, and additional circuitry is required to approximate linear operation. Also, staturable reactor characteristics are not uniform from component to component.

It is therefore an object of this invention to provide a frequency controlled range gate generator which will operate accurately over a wide range of temperature variations.

A further object of this invention is to provide a simplified and accurate frequency controlled range gate by utilizing an oscillator which will operate linearly over a wide range of control potential.

Yet another object of this invention is to provide a useful circuit including a two-frequency, controlled oscillator which will provide an average frequency that varies linearly with the potential of a control voltage.

Another object of this invention is to provide a simplified means to control the frequency of an oscillator.

It is another object of this invention to provide a simplified means to control the reactance supplied to a circuit.

According to one embodiment of this invention a range gate circuit includes a frequency variable oscillator comprising an amplifier and a crystal controlled feedback arrangement. The oscillator output is utilized to control a frequency divider or counter circuit. In response to a fixed number of pulses the frequency divider forms a range gate pulse, which is passed through conventional early gate and late gate circuits to a time discriminator. The time discriminator compares the time of occurrence of the range gate pulse with that of an echo pulse and supplies current pulses, which are proportional to the relation in time of occurrence of these pulses. From these current pulses an electronic integrator forms a control potential. The control potential passes to a phantastron circuit which controls the width of an output pulse during the interpulse periods determined by the triggering action of another output from the frequency divider. The output of the phantastron is connected to the input of the oscillator and also to a potential source by way of an impedance means which is biased in and out of conduction in response to the output pulse. A reactance is connected between the diode and the feedback loop of the oscillator, which normally oscillates at one frequency. The reactance causes the oscillator to operate at a second frequency when it is included in the oscillator feedback loop by the action of the impedance means responding to the phantastron output pulse. The average frequency during each interpulse period is found to vary in a linear fashion over a wide range of frequencies with the control potential provided by the time discriminator and associated circuitry. Thus, the time of occurrence of each succeeding range gate pulse, which is determined by the fixed count-down ratio of the frequency divider, also varies linearly with the control potential supplied to the phantastron from the time discriminator. This provides a simplified and highly accurate range gate.

The novel features of this invention, as well as the invention itself, both as to its organization and method of operation, will best be understood from the accompanying description, taken in connection with the accompanying drawings, in which like reference numerals refer to like parts, and in which.

Figures 1, 2:
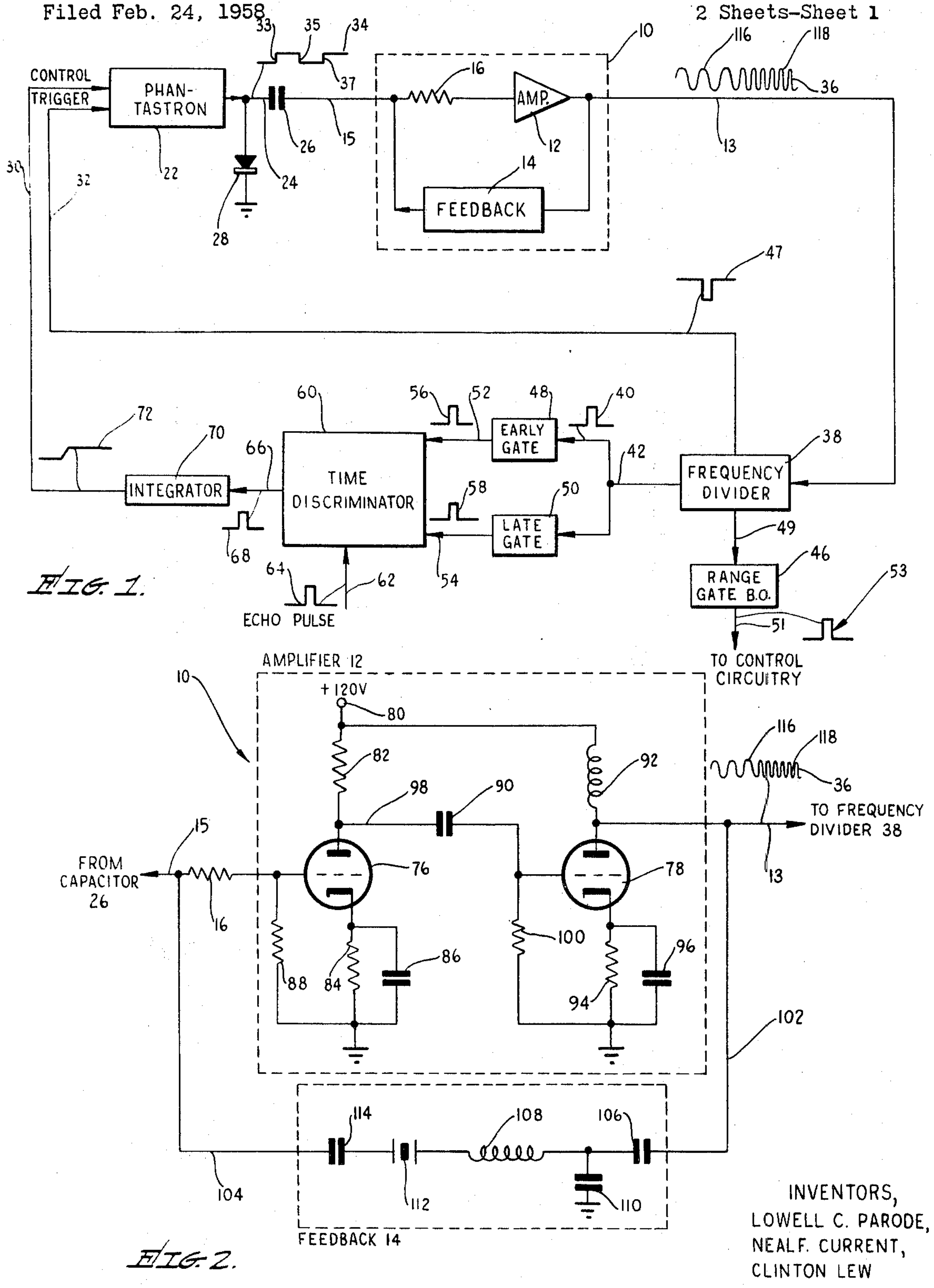
FIG. 1 is a block diagram of the frequency controlled range gate system of this invention, including a phantastron circuit and a two-frequency, controllable oscillator.
FIG. 2 is a schematic diagram of the oscillator circuit of FIG. 1, including an amplifier and a feedback network.

Referring first to FIG. 1, a block diagram is shown of one application of this invention of a range gate generator responding to echo pulses from a conventional radar system. An oscillator 10 is connected between lines 13 and 15 and includes an amplifier 12 connected between one end of an isolating resistor 16 and the line 13. The other end of the isolating resistor 16 is connected to the line 15. A feedback circuit 14 included in the oscillator 10 is connected between the lines 13 and 15.

A phantastron 22 has an output line 24 which is connected to the line 15 by way of a capacitance 26 to provide control of the oscillator 10. A diode 28 is connected to ground potential from line 24 to provide a current path as will be explained subsequently. The inputs to phantastron 22 are connected to a control line 30 and a trigger line 32. Thus, phantastron 22 is controlled to provide a waveform 34 to control oscillator 10 and generate a waveform 36, as will be explained.

The output of oscillator 10 is connected to the input of a frequency divider 38 to respond to the waveform 36. Frequency divider 38 is a counter and may be a series of blocking oscillators, as well known in the art, to provide a range gate pulse on line 42 as shown by waveform 40 in response to a fixed number of cycles of waveform 36. Another output of the frequency divider 38 is line 32 on which a trigger pulse as shown by waveform 47 is formed. The trigger pulse of waveform 47 and the range gate pulse 40 are formed from the last blocking oscillator of frequency divider 38 at the same time as the range gate pulse. A range gate pulse shown as waveform 53 passes from range gate blocking oscillator 46 to an output line 51 where it is utilized in control circuitry (not shown) to gate out undesired noise and signals, as well known in the art. Blocking oscillator 46 connects to frequency divider 38 by way of a line 49. The range gate pulse of waveform 53 occurs at approximately the same time as the range gate pulse of the waveform 40 and is passed through blocking oscillator 46 to provide power to the output.

The line 42 connects as inputs to early gate 48 and late gate 50 circuits which perform in a conventional manner. The output of the early gate 48 is connected through a line 52, and the output of the late gate 50 is connected through a line 54 to a time discriminator 60. The time discriminator 60 responds to the degree of time coincidence between the centroid of an early gate pulse and a late gate pulse of a waveform 56 and 58, respectively, with the centroid of an echo signal of waveform 64 on line 62 and forms a typical output signal of a waveform 68 on a line 66. As well known, the characteristics of the output signal are dependent on the degree of coincidence between the pulses. The line 66 connects as the input to an integrator 70, which in turn connects to the line 30 as the control input to the phantastron 22. The integrator 70 is a conventional circuit which responds to the waveform 68 to form a potential level or control signal such as waveform 72 on the line 30, thus providing a memory for the tracking loop. It is to be noted that the time discriminator 60 and the integrator 70 may be combined into a single circuit, as well known in the art.

In operation the oscillations as shown by waveform 36, which are comprised alternately of one frequency and then another, pass to the frequency divider 38 where they are counted by a chain of blocking oscillators, for example. Frequency divider 38 forms a trigger pulse of the waveform 47 and range gate pulses of the waveforms 40 after a fixed number of waveform 36 cycles. The trigger pulse, such as waveform 47, may connect to one of the grids of phantastron 22 to initiate a cycle of waveform 34. The range gate pulse of waveform 40 forms early and late gate pulses of waveforms 56 and 58, respectively, which are compared with the echo pulse of waveform 64 in the time discriminator 60 to result in a typical current signal waveform 68. The current signal of waveform 68 results in a changing potential level of the control signal of waveform 72, which is then dependent on the coincidence in the time discriminator 60. The potential level of the waveform 72 determines the time duration of the positive pulse of the waveform 34 from phantastron 22. As well known, the output of a phantastron as shown by the waveform 34 has a trigger edge 33, which results from the trigger pulse of the waveform 47, and has a crossover edge 35, which occurs at a time after the trigger edge 33 dependent in an approximately linear manner upon the potential level of the control signal of the waveform 72. Thus, the time duration of the positive portion of the waveform 34 varies directly with the potential of the waveform 72, which potential is determined by the time discriminator output.

When the waveform 34 is at a high potential, the diode 28 is biased into conduction. Then as will be explained subsequently, current from the feedback circuit 14 passes through the capacitor 26 to the ground potential connected to the diode 28. Thus, the reactance of capacitor 26 is included in the feedback loop 14 and resistor 16 to control the frequency of the oscillator 10 and to form the low frequency oscillations of the waveform 36 as shown by a pulse 116. At the crossover edge 35 of waveform 34, the potential on line 24 falls and the diode 28 is biased out of conduction, thus effectively removing the capacitance from the feedback circuit 14, since the ground potential is disconnected at the diode 28 to provide a high impedance to ground. Thus, the oscillator forms the high frequency oscillations of waveform 36 as shown by a pulse 118. The diode 28 provides an alternately low and high impedance path to ground potential through the capacitor 26 included in the feedback loop of the oscillator 10. The switching of the capacitor 26 in and out of the feedback loop of the oscillator circuit 10 changes the attenuation and phase shift characteristics of the oscillator. Therefore, the frequency of oscillation is changed between two frequencies as shown by the waveform 36.

The time of occurrence of the crossover edge 35, between the time of occurrence of trigger edges 33 and 37, determines which portion of the waveform 36 is comprised of low frequency oscillations and which portion is comprised of high frequency oscillations. As will be further discussed, the period between the trigger edges 33 and 37 is an interpulse period. Since frequency divider 38 forms the range gate pulse of the waveform 40 after a fixed number of waveform 36 cycles to vary the potential of the waveform 72, varying the relative time of duration of the high and the low frequency oscillations of the waveform 36 changes the time of occurrence of the succeeding range gate pulse 40 and the trigger pulse 47 following an interpulse period. Thus, the change in potential of the control signal of the waveform 72 changes the time of occurrence of the crossover edge 35 of the waveform 34 to vary the comparative number of high and low frequency oscillations of waveform 36 to change the time of occurrence of the next range gate pulse 40, for the early gate pulse 56 and the late gate pulse 58 as required to bracket the echo pulse of the waveform 64.

Therefore the two frequencies of oscillator 10 are controlled to give an average frequency during each interpulse period, which frequency varies in a linear manner with the control potential of the waveform 72, as will be explained subsequently. It is to be noted that the time duration of the interpulse period as defined by the trigger edges 33 and 37 of the waveform 34 varies as the proportional number of pulses of the waveform 36 as shown by the cycles 116 and 118 vary, a characteristic which may be utilized in range gates. However, when the range gate circuit is locked on target, i.e., the echo pulse 64 is centered between the early and late gate pulses of the waveforms 56 and 58, respectively, the interpulse period then remains fixed.

Referring now to FIG. 2, a schematic diagram is shown of the oscillator circuit of FIG. 1, including the amplifier circuit 12 and the feedback circuit 14. The amplifier circuit 12 includes amplifier tubes 76 and 78. The anode of amplifier tube 76 is connected to +120 volt terminal 80 by way of load resistor 82 and the cathode is connected to ground potential by way of bias resistor 84 and filter capacitor 86, connected in parallel. The grid of tube 76 is connected to isolating resistor 16 and is also connected to ground potential by way of grid leak resistor 88. The anode of amplifier tube 78 is connected to terminal 80 by way of tank coil 92 and the cathode is connected to ground potential by way of resistor 94 and filter capacitor 96. Line 98 is connected to the anode of tube 76 and to the grid of tube 78 by way of coupling capacitor 90. The grid of tube 78 is also connected to ground potential by way of grid leak resistor 100. Thus, oscillatory variations of potential on line 15 from the feedback circuit 14 vary the anode potential of amplifier tube 76 inversely. This anode potential in turn is inverted, further amplified in tube 78, and applied to feedback network 14. Thus, the oscillations as shown by waveform 36 appear at the anode of tube 78, which is connected to line 13.

Feedback circuit 14 which includes the oscillatory control elements arranged as a series resonant circuit will now be described. The feedback line 102 is connected from the line 13 to one end of a capacitor 106 which, with capacitor 110 and inductance 92, comprises the tank circuit. The other end of capacitor 106 is connected to one end of inductor 108, which provides an increased frequency range, and to ground potential by way of capacitor 110. Capacitors 106 and 110 act in the circuit as a capacitive divider of the feedback voltage. The other end of inductor 108 is connected to one end of crystal 112, utilized as the frequency stabilizing element, and having a selected resonant frequency. The other end of the crystal 112 is connected to tuning capacitor 114, which in turn is connected to a line 104 connected from line 15.

In operation, the amplifier 12 provides approximately 360° phase shift. The crystal oscillator 12 oscillates at such a frequency as to provide approximately zero degrees phase shift through feedback network 14 when capacitor 26 (FIG. 1) is not connected into the circuit i.e., when diode 28 is biased into a nonconductive state. When diode 28 (FIG. 1) is biased into conduction, more current passes through capacitor 26, which is then included in the series resonant feedback circuit 14. The oscillator 12 will then oscillate at another frequency, lower, for instance, such that the net phase shift through feedback network 14 is approximately zero. Therefore, oscillator circuit 10 has two frequencies of oscillation, as determined by switching capacitor 26 in and out of the series resonant feedback circuit. Since the oscillator type is well known, it will not be explained in further detail. It is to be noted that oscillator 10 may be any type of oscillator and is not restricted to the one described. A capacitance may be switched in and out of any tank circuit, for example. Also, any desired reactance element may be utilized in place of capacitor 26. It is also to be noted that the arrangement of this invention to switch a reactance in and out of a circuit may be utilized in many other types of circuits, as for example, in automatic gain control circuits.

Referring now to FIG. 1 and also to FIG. 3, which shows a schematic diagram of typical waveforms, the operation of this invention in relation to the timing will be described in more detail.

Figure 3:
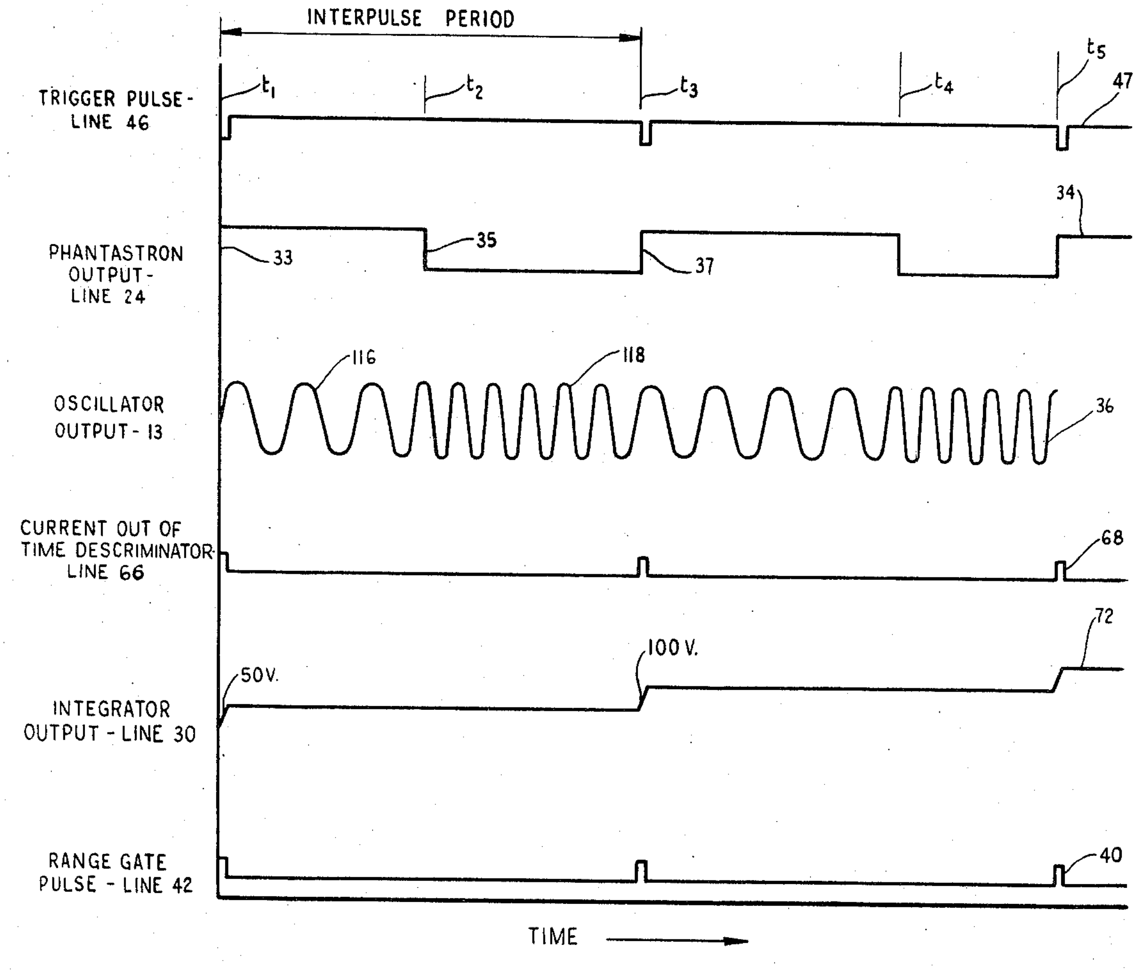
FIG. 3 is a diagram of waveforms to explain the operation of this invention.

The waveforms of FIG. 3 illustrate an example of the range gate following a tracked object from which echo pulses are received in order that the range gate pulse will be maintained coincident in time with the echo pulses. At time $t_1$ the control signal of the waveform 72 will be assumed at 50 volts due to events during previous interpulse periods, as defined by the time between trigger pulses of waveform 37. Thus, the trigger edge 33 of waveform 34 occurs at time $t_1$ to give a high potential on line 24. This high potential of waveform 34 is maintained until time $t_2$ as shown by the crossover edge 35. As previously discussed, the time of occurrence of crossover edge 35 is determined by the assumed 50 volt potential of waveform 72, for example. Between times $t_1$ and $t_2$ the oscillator output on line 13 has a frequency as shown by the typical cycle 116 of waveform 36. As discussed, the phantastron output biases diode 28 into conduction and causes capacitor 26 to be included in the series resonant circuit of feedback circuit 14. When waveform 34 falls to the low potential at time $t_2$, diode 28 is biased out of conduction resulting in capacitor 26 being effectively removed from the series resonant circuit of feedback circuit 14. Thus, the frequency of waveform 36 is increased as shown by typical cycle 118. After a fixed number of cycles of waveform 36, which are shown as 9 cycles for simplicity of explanation, frequency divider 38 forms the trigger pulse 47 and a range gate pulse 40 at time $t_3$. The corresponding pulses 56 and 58, when compared with echo pulse 64, which is assumed for illustrative purposes to occur later than the average time of occurrence of pulses 56 and 58, result in a current pulse at time $t_3$ out of time discriminator 60, as shown by typical waveform 68. Also at time $t_3$ the current pulse of waveform 68 passing into integrator 70 causes a change of potential on line 30 as shown by waveform 72. It is to be noted that the change of potential from 50 volts to 100 volts is entirely illustrative and for purposes of explanation only. In actual operation many interpulse periods would be required for this relatively large change in potential level of the control voltage of waveform 72.

At time $t_3$ upon the occurrence of a trigger pulse of wave form 47 the phantastron output of waveform 34 again rises to the higher potential, baising diode 28 back into conduction. Because of the larger potential of control voltage of waveform 72 the high potential of waveform 34 is maintained until time $t_4$, which is a greater interval than in the first interpulse period. The high frequency oscillation of waveform 36 occurs during this period between time $t_3$ and $t_4$. At time $t_4$ the potential of waveform 34 falls to a low level resulting in the high frequency oscillations as shown by waveform 36. At time $t_5$ the trigger edge of waveform 34 is again formed by the trigger pulse of waveform 47. Since the period between times $t_3$ and $t_4$ during which the lower frequency oscillations occurred is greater than that during the first interpulse period, the time between $t_3$ and $t_5$, during which a fixed number of cycles occur, is increased. Therefore, the pulse out of the frequency divider 38 as shown by the pulse 40 does not occur until approximately time $t_5$.

Thus the time of occurrence of the range gate pulse of waveform 40 is progressively delayed to coincide with the incoming echo pulses of waveform 64. It is to be again noted that many interpulse periods are required to move the range gate pulse as far as indicated between $t_3$ and $t_5$, for example. The frequency oscillator 10 is controlled to maintain a desired coincidence of the echo signal with the early gate pulse and late gate pulse of waveforms 56 and 58, respectively.

The oscillator output frequency of waveform 36 is at one frequency during part of the interpulse period and at another frequency during the balance of the interpulse period. The average frequency during each interpulse period is found to vary substantially linearly with the control potential of waveform 72 as will be discussed. The average frequency is defined during interpulse period $t_1$ to $t_3$ as the oscillator frequency during times $t_1$ to $t_2$ multiplied by the time interval between $t_1$ and $t_2$, the product added to the frequency during $t_2$ to $t_3$ multiplied by the time between $t_2$ and $t_3$, all divided by the time between times $t_1$ and $t_3$. This average frequency has been found to vary linearly with the control voltage in the circuit of the invention, as will be discussed subsequently. Although the time of each interpulse echo period varies when the echo signal of waveform 64 is received from a moving target (not shown) the time of formation of range gate pulses of waveform 40 also varies to compensate in a linear manner with the potential of waveform 72 applied to phantastron 22. The average frequency during equivalent interpulse periods is a fixed number of cycles per second, as defined above. Thus, the time of occurrence of a fixed number of counts passed into frequency divider 38, which responds to the positive pulses of waveform 36, for example, also varies directly with the control voltage of waveform 72.

Because frequency divider 38 forms range gate pulse 40 after a fixed number of counts, the improved range gate of this invention operates in a linear manner over a wide range of operation. In effect, the average frequency during each interpulse period is utilized to control the range gate of this invention.

Figure 4:
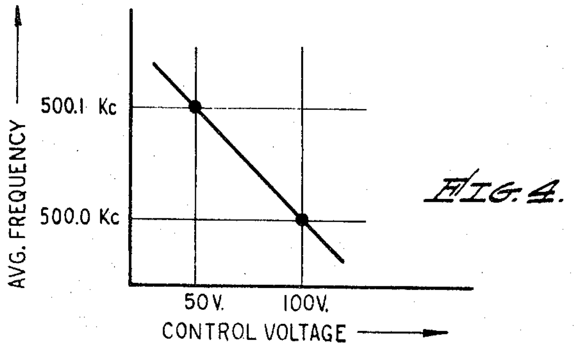
FIG. 4 is a graph to illustrate the linear operation of the controllable oscillator.

Referring now to FIG. 4, a graph is shown to further illustrate the approximately linear opertion of the two-frequency oscillator 10. It has been found that with the arrangement of this invention the average frequency, as defined above, of waveform 36 during each interpulse period varies in a substantially linear manner with the control voltage of waveform 72. For example with a control voltage of 50 volts the average frequency may be 500,100 c.p.s. and with a control voltage of 100 volts the average frequency may be 500,000 c.p.s. The frequency has then been found to vary in a substantially linear manner over a range from 500,000 c.p.s. to 500,100 c.p.s. with a control voltage potential change between 50 volts and 100 volts. Over a similar range, the c.p.s. per volt slope variation, from an average linear slope was found to vary only 12%. Thus, the average frequency out of the oscillator 10 varies nearly linearly with the control voltage to provide a system which has a minimum of components, and does not require any arrangements for correcting linearity. Therefore, the phantastron controlled oscillator is an improved circuit providing linear operation which has many uses where frequency variation may be utilized. As discussed, utilizing the linear operating circuit with the frequency divider results in a linear operating range gate.

Thus, there has been described a frequency control range gate which includes a two freqency oscillator with its series resonant feedback circuit also connected to a capacitor and to a controllable diode as an impedance path to ground. A phantastron is utilized to provide an output which controls the diode for switching it in and out of conduction. The switching of the oscillator from one frequency to another during each interpulse period, as determined by a trigger pulse to the phantastron, results in an average frequency directly proportional to the control voltage. This average frequency is utilized in a counter during each interpulse period to form a range gate pulse which is compared with the echo pulse in a time discrimination. The result of the comparison of these two pulses then varies the control voltage of the phantastron for maintaining the range gate pulse on target.

What is claimed as new is:

1. A variable impedance circuit for changing the impedance utilized in an oscillator circuit to two values, said oscillator circuit including a parallel coupled amplifier and a feedback reactance means with a current path therethrough, the variable impedance circuit comprising a pulse forming circuit having a first and a second input terminal and having an output terminal to form an output pulse proportional in width to the amplitude of a control potential applied to said first input terminal, a source of trigger pulses coupled to said second input terminal for initiating the formation of said output pulse, a diode coupling the output terminal of said pulse forming circuit to a source of constant potential, said diode conducting current from said feedback reactance means in response to said output pulse, and impedance means coupled between the output terminal of said pulse forming circuit and said oscillator circuit through which current passes in response to said output pulse to provide an increase of reactance in said oscillator to change the frequency of oscillation thereof during a time as determined by the amplitude of said control potential.

2. A two-frequency oscillating system comprising a pulse forming circuit having a first and a second input terminal and having an output terminal for providing an output pulse changing from a high potential to a low potential at a time proportional to a control voltage applied to said first input terminal, a source of trigger pulses coupled to said second input terminal for applying trigger pulses thereto to determine the duration of each cycle of a high and a low potential, a diode coupled between said output terminal and a source of reference potential to be biased into conduction in response to the high potential of said output pulse, an oscillator including a resonant feedback circuit coupled to the output terminal of said pulse forming circuit and having a current path, an impedance element coupled between the output terminal of said pulse forming circuit and said current path of said resonant feedback circuit, said oscillator having a first frequency of oscillation when said diode is biased into conduction and a second frequency of oscillation when said diode is biased out of conduction, and counting means coupled between said oscillator and said source of trigger pulses to form said trigger pulses in response to a fixed count of oscillating signals developed by said oscillator, and utilization means coupled between said counting means the first input terminal of said pulse forming means responsive to said trigger pulses to form said control voltage during each cycle, whereby the potential at said first input terminal of said pulse forming circuit controls the conductivity of said diode to provide an average frequency of said oscillating signal during each cycle which varies linearly with said control potential.

3. A system responding to the time of occurrence of a random signal for varying the average frequency of an oscillator during each of a plurality of periods comprising a pulse forming circuit having an input terminal and a trigger terminal and having an output terminal to provide a change from a high to a low signal potential thereat at a time during each of said periods, proportional to a control voltage applied to said input terminal, a diode coupled between said output terminal and a source of reference potential to conduct in response to said high potential at the output terminal of said pulse forming circuit, an impedance element having one end coupled to the output terminal of said pulse forming circuit, an oscillator coupled to the other end of said impedance element, said oscillator forming oscillating signals controlled by a feedback path the attenuation and phase characteristics of which are controlled by said impedance element and said diode so the frequency of said oscillating signals changes at a time during each period proportional to the voltage at the input terminal of said pulse forming circuit, and means coupled to said oscillator, to the input terminal and to the trigger terminal of said pulse forming circuit and responsive to said random signal for counting the cycles of said oscillating signals to develop said trigger pulses to control the periods of said pulse forming means and responsive to said random signal to form said control voltage to control the time of change of said potential signal at the output terminal of said pulse forming circuit.

4. A variable frequency oscillator system for providing signals at an average frequency during trigger periods comprising a phantastron circuit having a control terminal a trigger terminal and having an output terminal on which a potential changes at a time between application of trigger pulses to said trigger terminal, which time varies linearly with a potential applied to said control terminal, a diode coupled between the output terminal of said phantastron and a source of reference potential so as to conduct in response to a high potential at the output terminal of said phantastron and to be rendered nonconductive in response to a low potential at the output terminal of said phantastron, an oscillating circuit coupled to the output terminal of said phantastron, said oscillating circuit having a first feedback path for oscillating at a first frequency and a second feedback path for oscillating at a second frequency, impedance means coupled between said oscillating circuit and the output terminal of said phantastron to be included in said first feedback path when said diode conducts to cause said oscillator circuit to oscillate at said first frequency, said circuit oscillating at said second frequency when said diode is non-conductive so that the frequency of said oscillating circuit is changed to said second frequency at a time proportional to the potential applied to said control terminal of said phantastron circuit to develop an average frequency during each trigger period that varies linearly with the potential applied to the control terminal of said phantastron.

5. A range gate circuit receiving an echo signal to vary the time of occurrence of a range gate pulse defining interpulse periods comprising: a timing circuit having a control input, a trigger input and an output on which output a change from a high to a low potential is formed at a time during each interpulse period proportional to the potential at said control input; a diode connected between said output and a constant potential source; an oscillator connected to said output having a feedback circuit to control frequency; an impedance connected between said feedback circuit and said diode; a frequency divider connected to the output of said oscillator to provide a trigger pulse at a first output to said timing circuit to initiate and terminate interpulse periods, said divider having a second output on which a range gate pulse is formed; coincidence measuring means connected to said first output of said divider to compare said range gate pulse and said echo signal to form an output signal as determined by the amount of coincidence; integrating means to form a potential connected to control said timing circuit in response to the output of said integrating means, whereby the change in frequency of said oscillator during each interpulse period varies the time of occurrence of said range gate pulse to vary with said echo signal.

6. A range gate circuit responding to a random signal during trigger periods comprising: a timing circuit having a control input, a trigger input and an output on which is formed, during trigger periods, a positive pulse whose width varies with the potential at said control input; and oscillator connected to said output, having resonance elements connected in a feedback arrangement; a diode connected from the output of said timing circuit to a constant potential to conduct in response to said pulse at said output; an impedance connected between said diode and said oscillator, to be included in said oscillator when said diode conducts; means connected to the output of said oscillator to respond to the average frequency during each trigger period and form a gating signal, to form a control potential indicating the time difference beween the gating signal and said random pulse, and to form a trigger pulse for initiating trigger periods, whereby the control potential during each trigger period causes the timing circuit to vary the average frequency to control the time of occurrence of said gating signal.

7. A range gate circuit receiving an echo pulse to control the time of occurrence of a range gate pulse during interpulse periods comprising: a timing circuit having a control input, a trigger input and an output on which output is formed a pulse having a time duration which varies linearly between interpulse periods with the potential applied to said control input; a diode connected between said timing circuit output and a constant potential to conduct in response to said pulse at said output; an oscillator connected to said output having an amplifier and a crystal connected in a feedback arrangement; a reactance connected between said oscillator and said diode to be included in said crystal oscillator circuit when said diode conducts; a counter divider connected to the output of said oscillator to form after a fixed count of cycles from said oscillator a range gate pulse and to form a trigger pulse which is passed to said timing circuit to initiate interpulse periods; said oscillator forming cycles of a first frequency when said diode conducts and of a second frequency when said diode is biased out of conduction; time discriminator and integrator means connected to said counter to receive said range gate pulse and said echo pulse to form an integrated control signal of a potential which varies from one interpulse period to another with the average frequency from said oscillator to provide said trigger input to said timing circuit and a range gate which operates in a linear manner.

8. A range gate circuit receiving an echo pulse to control the time of occurrence of a range gate pulse during interpulse periods, having a counter responding to a fixed number of pulse cycles at its input to form a range gate pulse and a trigger pulse, said trigger pulses determining said interpulse periods, a time discriminator and integrator means connected to said counter to receive said range gate pulse and said echo pulse to form a control signal, a timing circuit having a control input to receive said control signal, including a trigger input and including an output on which a pulse is formed of a time duration which varies linearly between interpulse periods with the potential applied to said control input, a diode connected between said timing circuit output and a potential source to conduct in response to said pulse from said timing circuit, the combination with said circuit of an oscillator comprising: an amplifier connected between said timing circuit output and said time discriminator; a feedback arrangement connected to said amplifier including a control crystal; a reactance connected between said feedback arrangement and said diode to be included in said crystal oscillator circuit when said diode conducts; said amplifier forming pulse cycles of a first frequency when said diode conducts to be passed to said counter and forming pulse cycles of a second frequency to be passed to said counter when said diode is biased out of conduction.

References Cited

UNITED STATES PATENTS

| | | | |
|---|---|---|---|
| 2,588,551 | 3/1952 | McCoy | 250—36–19.1 |
| 2,636,941 | 4/1953 | Singel | 178—66A |
| 2,748,284 | 5/1956 | Segerstrom | 250—36–19.1 |

RODNEY D. BENNETT, Jr., Primary Examiner

T. H. TUBBESING, Assistant Examiner

U.S. Cl. X.R.

331—36, 179